United States Patent
Rönngren

(10) Patent No.: US 11,327,313 B2
(45) Date of Patent: May 10, 2022

(54) METHOD AND SYSTEM FOR RENDERING AN IMAGE WITH A PUPIL ENHANCED ACCOMMODATION OF THE EYE

(71) Applicant: Tobii AB, Danderyd (SE)

(72) Inventor: Denny Rönngren, Danderyd (SE)

(73) Assignee: Tobii AB, Danderyd (SE)

( * ) Notice: Subject to any disclaimer, the term of this patent is extended or adjusted under 35 U.S.C. 154(b) by 42 days.

(21) Appl. No.: 16/833,814

(22) Filed: Mar. 30, 2020

(65) Prior Publication Data

US 2020/0393679 A1    Dec. 17, 2020

(51) Int. Cl.
| | | |
|---|---|---|
| *G02B 27/01* | (2006.01) | |
| *G02B 27/00* | (2006.01) | |
| *G06T 7/00* | (2017.01) | |
| *G06T 7/62* | (2017.01) | |
| *G06T 7/20* | (2017.01) | |
| *G06F 3/01* | (2006.01) | |
| *G06T 19/00* | (2011.01) | |
| *G06T 7/50* | (2017.01) | |

(52) U.S. Cl.
CPC ..... *G02B 27/0172* (2013.01); *G02B 27/0093* (2013.01); *G06F 3/013* (2013.01); *G06F 3/017* (2013.01); *G06T 7/0012* (2013.01); *G06T 7/20* (2013.01); *G06T 7/50* (2017.01); *G06T 7/62* (2017.01); *G06T 19/006* (2013.01); *G06T 2207/30041* (2013.01)

(58) Field of Classification Search
CPC .. G02B 27/0172; G02B 27/0093; G06T 7/62; G06T 7/50; G06T 7/0012; G06F 3/013; G06F 3/017
See application file for complete search history.

(56) References Cited

U.S. PATENT DOCUMENTS

| | | | | |
|---|---|---|---|---|
| 2008/0117289 A1* | 5/2008 | Schowengerdt | ..... | G02B 26/005 348/46 |
| 2009/0180165 A1* | 7/2009 | Haussler | .......... | G03H 1/08 359/9 |
| 2013/0050642 A1* | 2/2013 | Lewis | ............. | G02B 7/12 351/204 |
| 2016/0026253 A1* | 1/2016 | Bradski | ......... | H04N 21/414 345/8 |
| 2018/0165830 A1* | 6/2018 | Danieau | ........... | H04N 5/2224 |
| 2018/0196265 A1* | 7/2018 | Bouchier | ......... | G03H 1/2294 |

(Continued)

OTHER PUBLICATIONS

Rompapas, Damien Constantine, et al. "EyeAR: Refocusable augmented reality content through eye measurements." Multimodal Technologies and Interaction 1.4 (2017): 22 (pp. 1-18).*

(Continued)

*Primary Examiner* — Sarah Lhymn
(74) *Attorney, Agent, or Firm* — Samuel I. Yamron

(57) ABSTRACT

The present disclosure relates to a method for displaying an image with a specific depth of field. The method comprises the steps of obtaining information data related to a focal distance adapted to a user gazing at a display, determining a pupil size of said user, estimating a depth of field of said user's eyes based on said focal distance and said pupil size, and rendering an image based on said depth of field to be displayed on said display. Further, the present disclosure relates to a system, a head-mounted display and a non-transitory computer readable medium.

18 Claims, 5 Drawing Sheets

(56) References Cited

U.S. PATENT DOCUMENTS

| | | | | |
|---|---|---|---|---|
| 2019/0094981 A1* | 3/2019 | Bradski | .................. | G06F 3/017 |
| 2019/0392145 A1* | 12/2019 | Komogortsev | ......... | G06F 21/32 |
| 2020/0241635 A1* | 7/2020 | Cohen | ................. | G02B 27/017 |

OTHER PUBLICATIONS

Toyama, T., Orlosky, J., Sonntag, D., & Kiyokawa, K. (May 2014). A natural interface for multi-focal plane head mounted displays using 3D gaze. In Proceedings of the 2014 International Working Conference on Advanced Visual Interfaces (pp. 25-32).*

Liu, R., Jin, S., & Wu, X. (2007). Real time auto-focus algorithm for eye gaze tracking system. In 2007 International Symposium on Intelligent Signal Processing and Communication Systems (pp. 742-745). IEEE.*

* cited by examiner

METHOD AND SYSTEM FOR RENDERING AN IMAGE WITH A PUPIL ENHANCED ACCOMMODATION OF THE EYE

CROSS-REFERENCES TO RELATED APPLICATIONS

This application claims priority to Swedish Application No. 1950392-9, filed Mar. 29, 2019; the content of which are hereby incorporated by reference.

TECHNICAL FIELD

The present disclosure relates to a method for displaying an image with a specific depth of field. Further, the present disclosure relates to a system, a head-mounted display and a non-transitory computer readable medium.

BACKGROUND ART

It is well-known that objects rendered as Virtual Reality, VR, and Augmented Reality, AR, images in a displaying unit are projected on a specific depth from a user. This specific and defined depth creates a conflict to the user in the form of a convergence-accommodation conflict by forcing the user's brain to unnaturally adapt to conflicting cues while decreasing accuracy. The retinal blur, which is a visual cue of the human visual system, drives the occulomotor response of accommodation, or adjustment of the eye's lens to focus on the desired depth, thus minimizing the blur. Furthermore, the retinal disparity is the visual cue driving the convergence, which is the simultaneous movement of both eyes in opposite directions to obtain or maintain a single binocular vision.

One of the consequences of the disparity between the convergence and the accommodation is that the user may experience a visual fatigue, especially during prolonged use of displaying units. In certain domains such as 3D TV or cinema viewing, there are certain constraints that the content and displaying units need to fulfil. One of the constraints could be for instance a retinal disparity that has to fall within 1° safety zone with the focal cues. However, such as constraint requires that stereo parameters can be adjusted for each frame prior to viewing.

In the context of VR and AR applications, where the content is dynamic and interactive and nearby objects have to be shown in different near-point tasks, this type of safety zone constraints is not adequate and is accordingly violated.

In addition to safety issues, there is also a need for the user of obtaining a more natural experience, i.e. when the images or scenes have a field of view that is in agreement with the expectation of the eyes, when using VR and AR applications.

In other words, there is a need of a method and system that is capable of solving the above-mentioned problems.

SUMMARY OF THE INVENTION

Accordingly, there is a system provided that behaves more in line with the real world. This is achieved by a solution that takes in consideration factors that influence the accommodation of the eye such as the shape of the lens that governs the convergence point and the size of the pupil that governs the depth of field.

Hence, in accordance with the solution both the convergence point of the eyes and the pupil diameter of a user are captured. By using both the captured convergence point of the eyes and the pupil diameter of the user, a hologram can be rendered on a display unit at the correct distance. The objects in the hologram will appear having the right depth of field, i.e. the depth of field of the rendered hologram will correspond exactly as the real world.

Thus, the present disclosure relates to a method for displaying an image with a specific depth of field. The method comprises the steps of obtaining information data related to a focal distance adapted to a user gazing at a display, determining a pupil size of said user, estimating a depth of field of said user's eyes based on said focal distance and said pupil size, and rendering an image based on said depth of field to be displayed on the display. An advantage is that a more natural experience for the user is achieved, taking into account the pupil size of the user to render an image based on said depth of field.

The present disclosure also relates to a system for displaying an image with a specific depth of field. The system comprises a display, and at least one processor. The at least one processor is configured to obtain information data related to a focal distance adapted to a user gazing at the display, determine a pupil size of said user, estimate a depth of field of said user's eyes based on said focal distance and said pupil size, and render an image based on said depth of field to be displayed on said display. Further, the display is configured to display said rendered image to said user. An advantage is that a more natural experience for the user is achieved, taking into account the pupil size of the user to render an image based on said depth of field.

In one example, the system further comprises an eye tracking device configured to determine the information data related to a focal distance and send the information to the processor.

The display may comprise an array of optical micro-elements. The optical micro-elements may be active or passive. The array of optical micro-elements may be selected from arrays of micro-lenses; arrays of micro-holes; arras of liquid crystals, such as LCD or LCoS; arrays of gratings and arrays of phase masks. The digital display element may be selected from digital display screens such as LED, OLED, LCoS, LCD and SLM display screens.

In addition, there is provided a head-mounted display. Said head-mounted display comprises a frame adapted to be worn by a user, a display, and at least one processor. The at least one processor is configured to obtain information data related to a focal distance adapted to a user gazing at the display, determine a pupil size of said user, estimate a depth of field of said user's eyes based on said focal distance and said pupil size, and render an image based on said depth of field to be displayed on said display. Further, the display is configured to display said rendered image to said user. An advantage is that a more natural experience for the user is achieved, taking into account the pupil size of the user to render an image based on said depth of field.

In one example, the head-mounted display further comprises an eye tracking device configured to determine the information data related to a focal distance and send the information to the processor.

In a further example, the head-mounted display is adapted for virtual reality, augmented reality, mixed reality or other extended reality experiences.

Furthermore, there is provided a non-transitory computer readable medium having instructions stored thereon executable by a computer to cause the computer to perform the steps of: obtaining information data related to a focal distance adapted to a user gazing at a display, determining a pupil size of said user, estimating a depth of field of said user's eyes based on said focal distance and said pupil size, and rendering an image based on said depth of field to be displayed on said display.

Further, the step of determining a pupil size of the above-mentioned method may be performed by obtaining and selecting measurements of the pupil size of the user by using image data from an imaging device that is configured to take measurements of the pupil size. The imaging device may be part of an eye-tracking device. However, if such an imaging device is not available, the pupil size may be estimated by taking into consideration the luminosity of the display. Since light of the display affects the pupil size, the pupil size may be calculated based on the luminosity of the display.

Further, the information data related to the focal distance may comprise measurements of the distance at which gaze vectors from the left and right eyes of the user converge. In this case, the measured focal distance is the convergence distance, i.e. where gaze vectors from the user converge at a convergence point.

The information data related to the focal distance may also be based on a gaze point of the user directed to an object rendered on the display or displaying unit.

Furthermore, the above-mentioned method may further comprise a step of estimating an accommodation amplitude of the eyes of the user, which varies depending on age, overall brightness, sight correction, etc. This estimation is then used to estimate a depth of field for the images to be rendered. An advantage is that it is possible to estimating a depth of field of said user's eyes in dependence of the accommodation amplitude of the eyes of the user, such that a more natural experience is achieved.

As explained, the method may obtain measurements of the orientation of the eye for determining the convergence point and may determine the pupil diameter as well. These parameters may be used to produce and estimate the depth of field of the eye in the real world. If a user-calibrated eye model is used as an extra step in the method, the rendered images will have an even more realistic FOV adapted to the user's vision.

Furthermore, the step of estimating said depth of field, DOF, may include applying the user calibrated eye model such as PCCR, Pupil Centre Cornea Reflection-model.

BRIEF DESCRIPTION OF THE DRAWINGS

In the following, the disclosure will be described in further detail with references to the exemplary methods and system in the drawings, in which.

DETAILED DESCRIPTION

The apparatus, method and system for displaying an image with a specific depth of field will now be described more fully hereinafter with reference to the accompanying drawings, in which various examples are shown. The accompanying drawings are schematic and simplified for clarity and they merely show details, which are essential to the understanding of the invention, while other details have been left out. The appended patent claims may be embodied in different forms not shown in the accompanying drawings and should not be construed as limited to the examples set forth herein. Rather, these examples are provided so that this disclosure will be thorough and complete, and will fully convey the scope of the appended patent claims to those skilled in the art.

Figure 1:
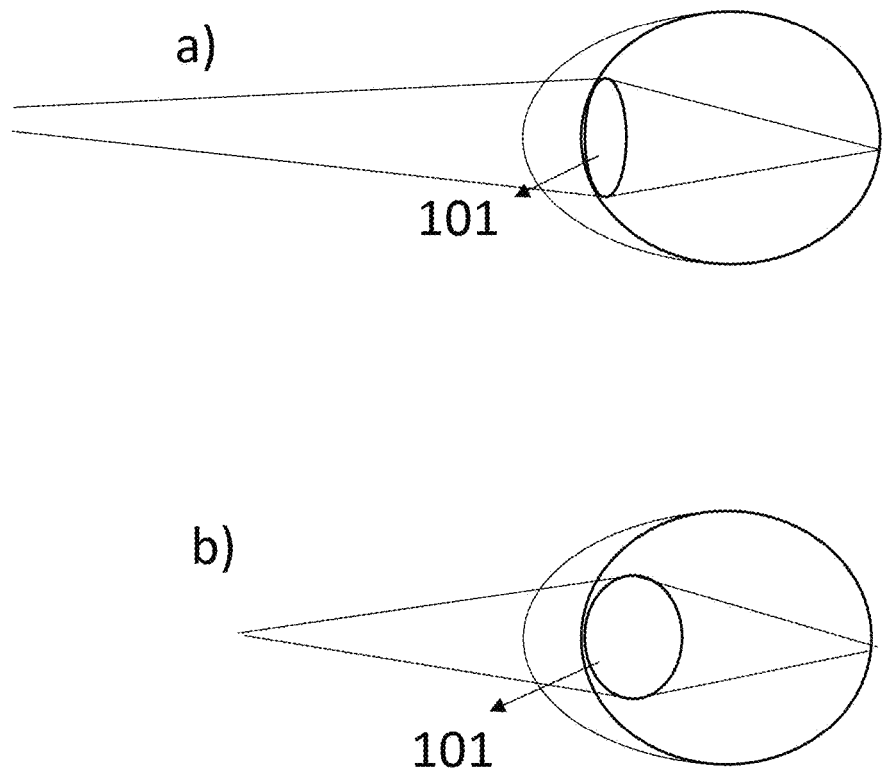
FIG. 1 shows a general representation of accommodation of an eye.

In FIG. 1, a general representation of accommodation of the same eye is shown. As seen, the eye focuses on an image through the process of accommodation, where the ciliary muscles can change the curvature of the lens 101. The eyes are still forced to focus and accommodate the lens 101 on a distance (focal distance) that should correspond to the convergence point of the user. This is in analogy with a pinhole camera, which is a camera with extremely small aperture, where the depth of field is very large, and objects close to the camera and far away from it are rendered sharply on the image plane. On the other hand, a camera with a large aperture has a narrower more shallow depth of field and objects nearby are rendered sharply at the same time as objects farther away are rendered blurry and appeared defocused.

For the human eye, the pupil diameter corresponds to the aperture in a camera system. In a well-lit environment, the pupil diameter can be 2 mm, which gives a depth of field of around 0.6 diopters, and the pupil can be 8 mm in a dark environment, which gives a depth of field of around 0.2 diopters. This information is normally used when rendering for instance holograms that need to blend into the environment in a convincing way.

In FIG. 1a, a far focus is shown. The eye is looking at a far distance where the light rays from far-away objects passes through the cornea and are spread at a smaller angle, i.e. closer to being parallel so little accommodation is needed. The ciliary muscles are then relaxed, and the lens 101 has the longest focal length.

On the opposite, in FIG. 1b, the eye is looking at a nearer object and the light rays from this close-by object have a greater angle so more refraction is required. The focal length of the lens needs to decrease to produce the image on the retina, so the ciliary muscles contract causing the lens to bend and bulge out. In other words, the lens of the human eye changes normally its refractive index, i.e. the degree of curvature of the lens when adapting to a focal distance. This allows a person to look at an object clearly and sharply on different distances.

Figure 2:
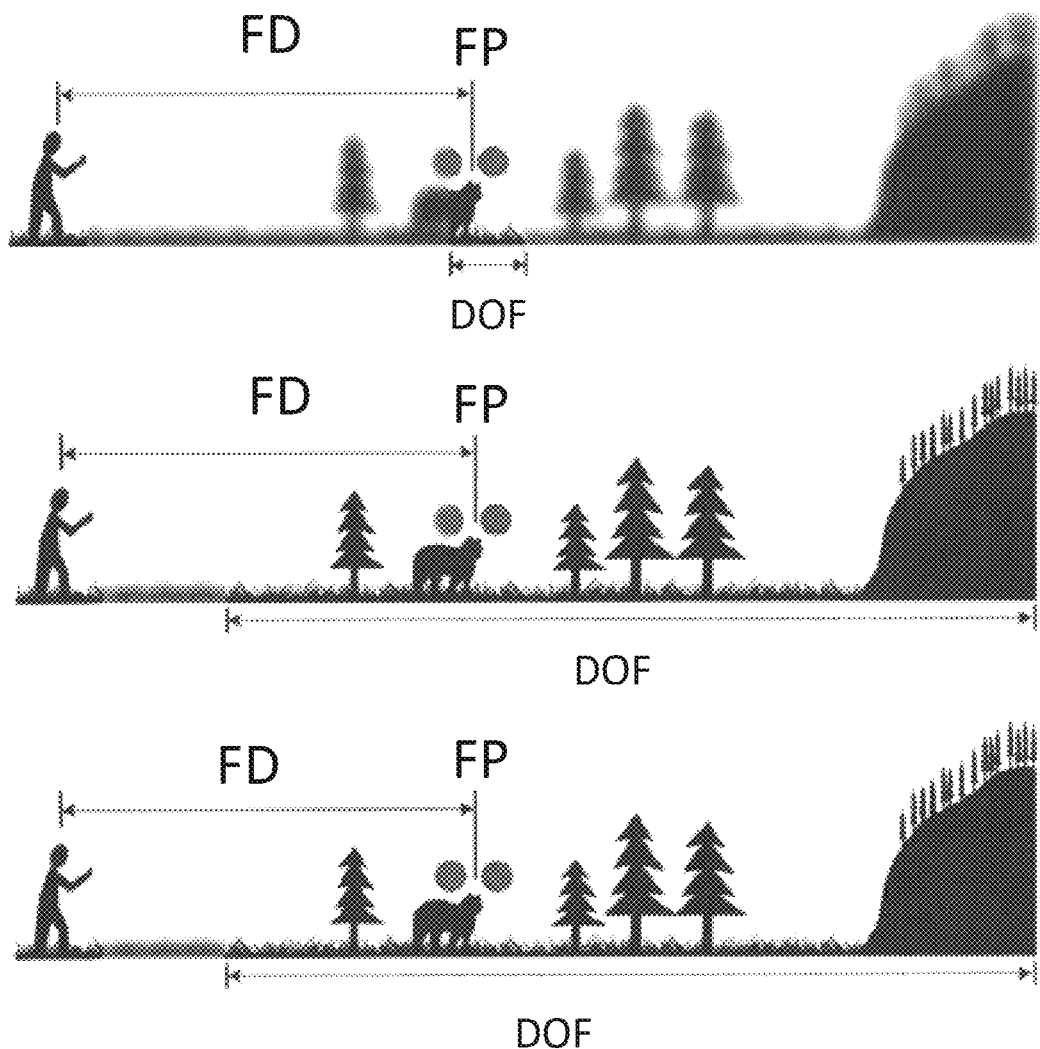
FIG. 2 shows examples of different depth of fields due to convergence distance and pupil size.

As seen in FIG. 2, three images are rendered. For all three images, the focal point FP is where the objects are projected. The above image shows a dark scene, such as a scene rendered in poor light conditions, where a user is looking at an image showing a cat on a certain distance at night. Such a scene can be a virtual 3D scene as in a computer game or created for a virtual reality or augmented reality in a HMD. The scene contains 3D objects which move within the scene over time. Some objects may indeed move out of the scene and other objects may move into the scene. When these 3D scenes are viewed on a monitor, display or a computer screen, the display or screen presents a 2D image representing a view on the 3D scene from a particular location in space through a framed area on a display for viewing information, i.e. a viewport. The viewport delimits the image that would be seen by a camera or eye located at notional position with respect to the 3D scene. The combination of the camera position and the viewport sets the field of view FOV. On the other hand, when 3D scenes are viewed through a HMD, each eye of a user is presented with a slightly different viewport onto a scene, from which the user's brain then perceives a single 3D image.

As previously explained, the eye accommodates to darkness by enlarging the pupil. However, due to the darkness, the depth of field, DOF, is very narrow and only parts of the cat are perceived as being sharp. The middle image shows a bright scene where the pupil of the user is consequently small to cope with the amount of light received. In this case, the depth of field, DOF, is large and most of the landscape is perceived properly. However, since the object rendered in VR or AR, i.e. the cat, is projected at a specific depth from the user, the focus point, FP, does not necessarily coincide with the convergence point, i.e. the point where both eyes converge so the objects are perceived as being sharp. This results in that the objects in the depth of field, DOF, are not completely sharp. Accordingly, there is a need to bring more sharpness in the images perceived by the user when observing objects projected in VR or AR, for instance in a hologram. This is achieved by the method according to the present disclosure and the effect is shown in the last image of FIG. 2. The scene is bright and the depth of field, DOF, is therefore the same as for the middle image. The difference with previous images is that all the objects in the depth of field, DOF, are correctly rendered according to the pupil size of the user gazing at the display.

Figure 3:
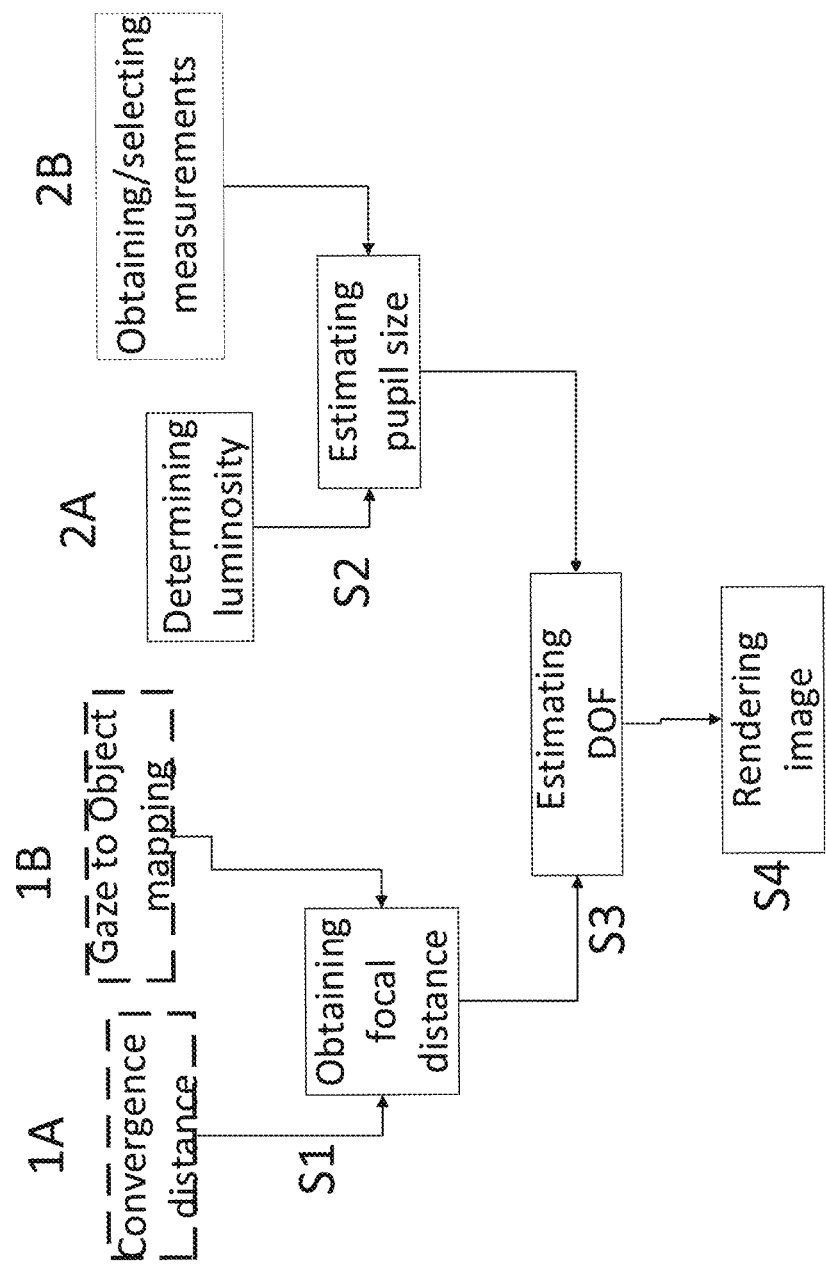
FIG. 3 illustrates a flowchart of the method according to an exemplary embodiment of the present disclosure.

The method for displaying an image with a specific depth of field according to an exemplary embodiment of the present disclosure is shown in FIG. 3. The method comprises a series of steps. In step S1, information data is obtained by a device, such as an eye tracking device or similar, capable of measuring information related to a focal or convergence distance adapted to a user gazing at a display. The display may be unifocal, i.e. having a single lens or the display may be varifocal, i.e. having adjustable optic lenses, which are able to modify the focal depth of the entire view. Ideally, the display used for the method is unifocal or varifocal and provides the user with a more natural experience, in terms of depth of field, for HMD images, holograms, VR-experiences.

Information data related to the focal distance may comprise measurements of the distance at which gaze vectors from the left and right eyes of the user converge 1A. The measured distance is the distance between the position of a user gazing at an object rendered on a display and a convergence point of the gaze vectors from both the left and right eyes, i.e. a convergence distance. At this convergence point, the user obtains a single binocular vision so the object is focused and sharp. Alternatively, the information data related to the focal distance may be based on a gaze point 1B of said user directed to an object rendered on the display.

The information data related to the focal distance may also be based on a gaze point of the user directed to an object rendered on the display or displaying unit.

A tracking device or like sends the information data to at least one processor, which obtains the information data related to the focal distance and stores it in a storage device. In step S1, it is assumed that the convergence distance is equal to the focal distance. If this is not the case, the discrepancy will be perceived by the user as an image with an incorrect depth of field, i.e. defocused.

Accordingly, in order to estimate a correct depth of field of said user's eyes, the pupil size of the user is determined in step S2. The method of the present disclosure determines the pupil size by either determining the luminosity of the display 2A or by obtaining and selecting measurements of the pupil size of the user 2B showing image data taken from e.g. an eye tracking device or similar.

In step S3, the depth of field of the user's eyes is estimated based on the obtained focal distance and the determined pupil size. Then, an image is rendered on the display in step S4 based on said estimated depth of field.

Figure 4:
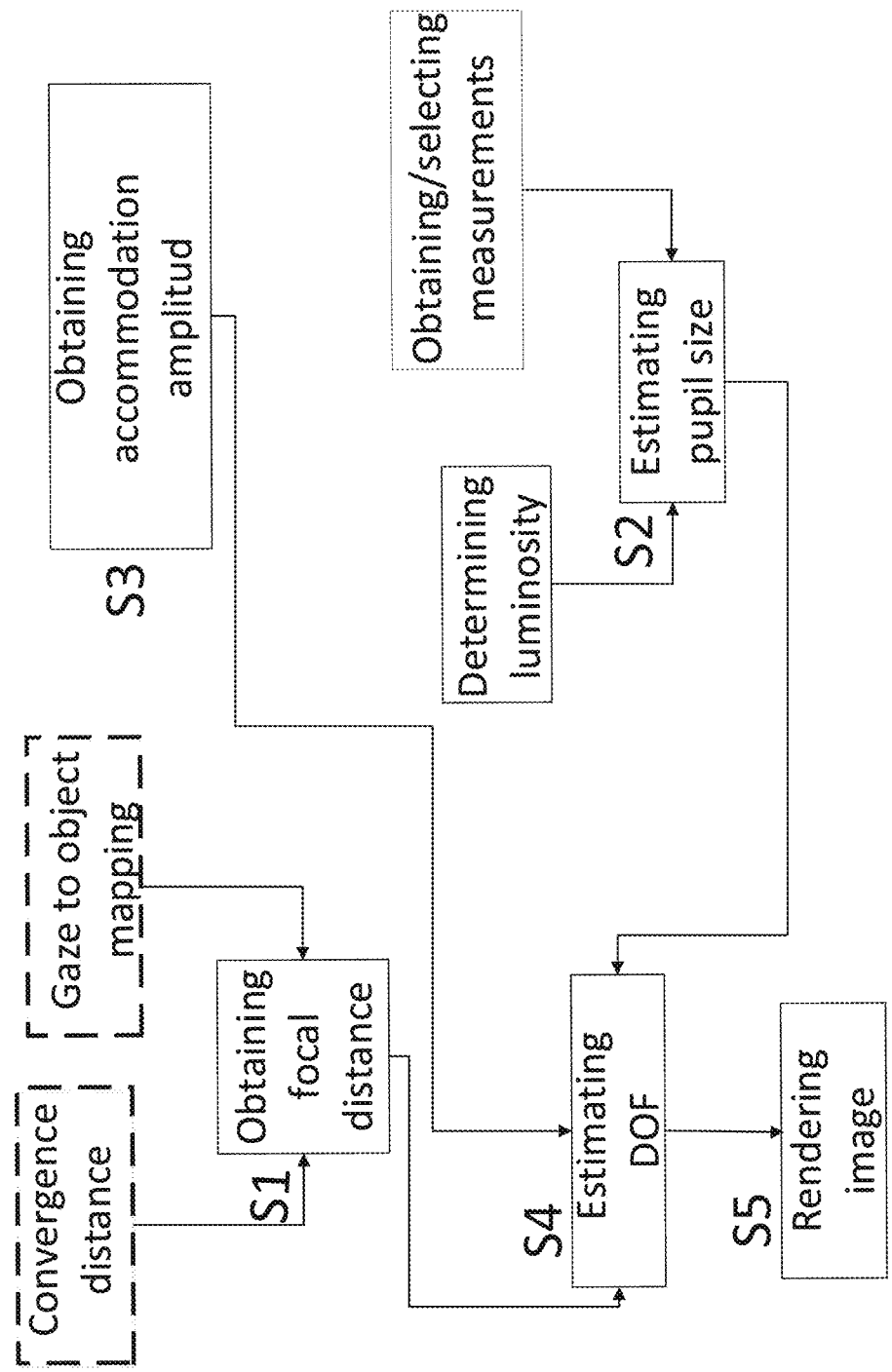
FIG. 4 illustrates a flowchart of the method according to another exemplary embodiment of the present disclosure.

An additional embodiment using the method according to the present disclosure is shown in FIG. 4. In this figure, another step is added to the method mentioned in the FIG. 3. In this case in step S3, information related to accommodation amplitude is also considered for estimating the depth of field adapted to the user. The accommodation amplitude is the maximum potential increase in optical power that an eye can achieve in adjusting its focus. It refers to a certain range of object distances for which the retinal image is as sharply focused as possible. The accommodation amplitude differs from each user due to different factors; among others are age, state of mind (affected by drugs, fatigue, etc.), ambient light intensity/colour, overall light intensity/colour and other factors that affect the degradation of flexibility of the lens in the eye. The accommodation amplitude may be estimated based on age and/or by a user-calibrated eye model.

A way of creating a user-calibrated eye model based on Pupil Centre Cornea Reflection PCCR is to perform a user-individual calibration at different depths/distances and with different pupil sizes/illumination levels. The user is individually presented with holograms on different depths under different lightning conditions and asked to provide feedback if the rendered holograms mixes into the environment. The results are then collected into the user-calibrated eye model that reveals the accommodation amplitude of the user. Consequently, the depth of field is estimated in step S4 based on the accommodation amplitude S3, the information data related to the focal distance S1 and the pupil size of the user S2. The image, which is adapted to the user, is rendered on the display in step S5.

Figure 5:
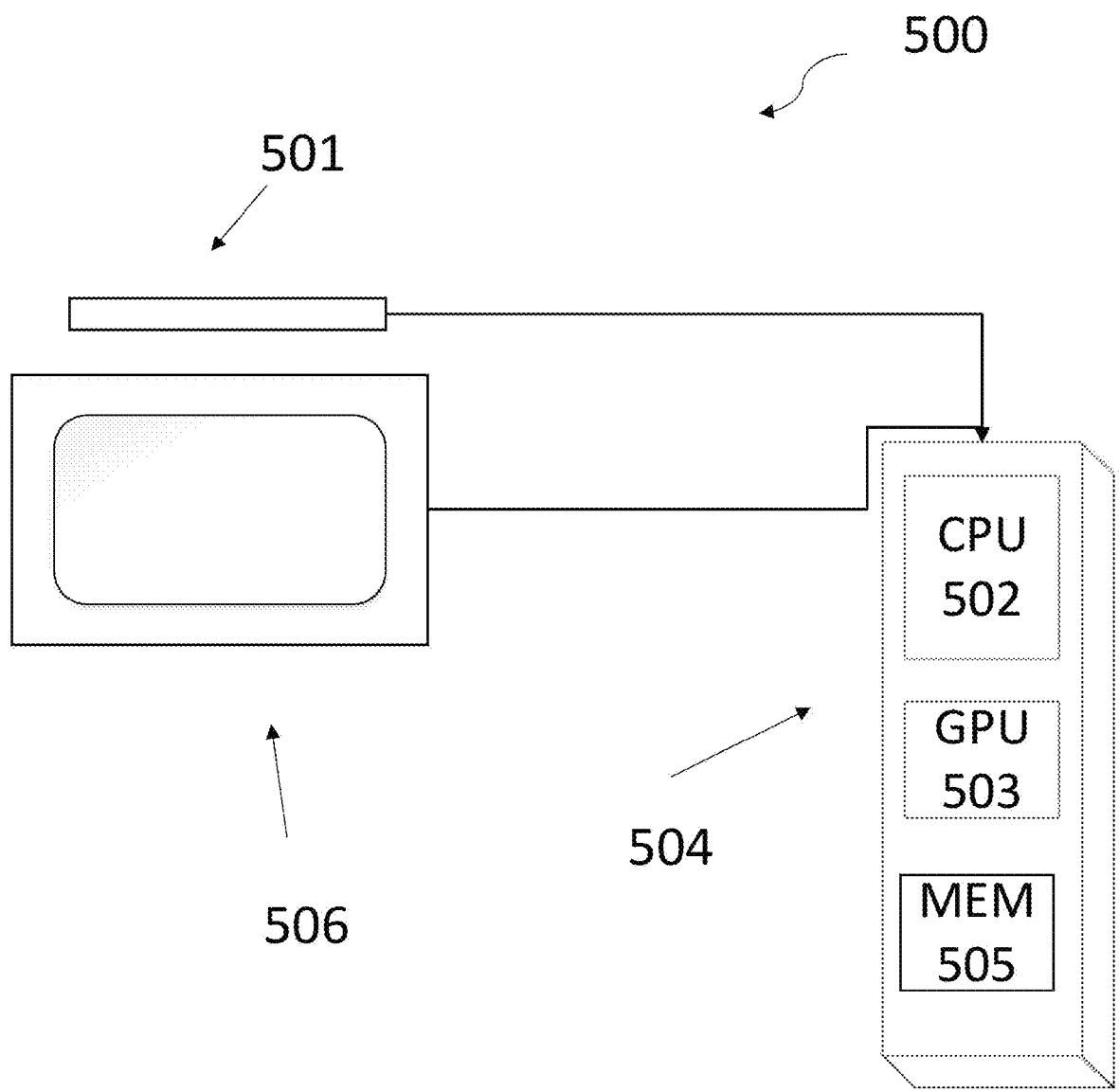
FIG. 5 illustrates a system according to any of the exemplary embodiment of the present disclosure.

In FIG. 5, a system 500 for displaying an image with a specific depth of field according to any exemplary embodiments is shown. The system 500 comprises at least one processor such as a central processing unit, CPU, 502 and a graphic processing unit, GPU, 503, which is configured to perform all the method steps shown in FIGS. 3 and 4 and a display 506 for displaying the rendered image to the user. The at least one processor may be part of a computer device 504 together with a memory unit or storage device 505. By way of example, the storage device 505 may be disk drives, optical storage devices, solid-state devices such as a random access memory ("RAM") and/or a read-only memory ("ROM"), which can be programmable, flash-updatable and/or the like. Further, the system 500 may comprise an eye tracking device 501 configured to determine a focal distance adapted to a user. Yet further, the system 500 may comprise an imaging device (not shown). The imaging device may be any imaging device, or camera, directed towards at least one eye of the user. Further, the imaging device may be part of the eye tracking device 501. Yet further, the imaging device, or camera, may be stand-alone from an eventual eye tracking device 501. In another example, the system 500 may comprise a light sensor (not shown) configured to measure the level of ambient light, in order to estimate the pupil size.

The computer 506 shown in FIG. 5 is configured to comprise a non-transitory computer readable medium that has instructions stored thereon and these are executable by the computer 506 to cause the computer to perform any of the method steps described in FIGS. 3 and 4.

Another exemplary embodiment (not shown) according to the present disclosure is a head-mounted display, such as a pair of glasses, a virtual reality headset, an augmented reality headset, a helmet or the like, for the display and visualization of computer-generated images. The head mounted display comprises a frame adapted to be worn by a user, at least one processor such as a CPU or GPU configured to perform all the method steps described in FIGS. 3 and 4. The head-mounted display also comprises a display for displaying the rendered image to the user. Further, the head-mounted display may comprise an eye tracking device configured to determine a focal distance adapted to a user.

The invention claimed is:

1. A method for displaying an image with a specific depth of field, the method comprising the steps of:
   obtaining information data related to a focal distance adapted to a user gazing at a display,
   determining a pupil size of said user,
   estimating a depth of field of said user's eyes based on said focal distance and said pupil size, wherein the step of estimating said depth of field includes applying a user calibrated eye model, and
   rendering an image based on said depth of field to be displayed on said display.

2. The method according to claim 1, wherein the step of determining said pupil size is performed by first determining a luminosity of said display and then by estimating said pupil size based on said luminosity.

3. The method according to claim 1, wherein the step of determining a pupil size of the user is performed by obtaining and selecting measurements of said pupil size of said user by using image data from an imaging device.

4. The method according to claim 1, wherein the information data related to said focal distance comprises measurements of the distance at which gaze vectors from the left and right eyes of said user converge.

5. The method according to claim 1, wherein the information data related to said focal distance is based on a gaze point of said user directed to an object rendered on said display.

6. The method according to claim 1, wherein the method further comprises the step of estimating an accommodation amplitude of the eyes of said user and wherein the step of estimating a depth of field is further based on said accommodation amplitude.

7. The method according to claim 1, wherein the user calibrated eye model is based on PCCR, Pupil Centre Cornea Reflection-model.

8. A system for displaying an image with a specific depth of field, the system comprising:
   a display, and
   at least one processor configured to:
      obtain information data related to a focal distance adapted to a user gazing at the display,
      determine a pupil size of said user,
      estimate a depth of field of said user's eyes based on said focal distance and said pupil size, wherein the step of estimating said depth of field includes applying a user calibrated eye model, and
      render an image based on said depth of field to be displayed on said display,
   wherein the display is configured to display said rendered image to said user.

9. The system according to claim 8, further comprising an eye tracking device configured to determine the information data related to a focal distance and send the information to the processor.

10. The system according to claim 8, wherein the processor is further configured to first determine a luminosity of said display and then estimate said pupil size based on said luminosity.

11. The system according to claim 8, wherein the processor is further configured to obtain and select measurements of said pupil size of said user by using image data from an imaging device.

12. The system according to claim 8, wherein the information data related to said focal distance comprises measurements of the distance at which gaze vectors from the left and right eyes of said user converge.

13. The system according to claim 8, wherein the information data related to said focal distance is based on a gaze point of said user directed to an object rendered on said display.

14. The system according to claim 8, wherein the processor is further configured to estimate an accommodation amplitude of the eyes of said user and wherein the estimate of the depth of field is further based on said accommodation amplitude.

15. The system according to claim 8, wherein the user calibrated eye model is based on PCCR, Pupil Centre Cornea Reflection-model.

16. A head-mounted display, said head-mounted display comprising:
   a frame adapted to be worn by a user,
   a display, and
   at least one processor configured to:
      obtain information data related to a focal distance adapted to a user gazing at the display,
      determine a pupil size of said user,
      estimate a depth of field of said user's eyes based on said focal distance and said pupil size, wherein the step of estimating said depth of field includes applying a user calibrated eye model, and
      render an image based on said depth of field to be displayed on said display,
   wherein the display is configured to display said rendered image to said user.

17. The head-mounted display according to claim 16, further comprising an eye tracking device configured to determine the information data related to a focal distance and send the information to the processor.

18. The head-mounted display according to claim 16, wherein the head-mounted display is adapted for virtual reality, augmented reality, mixed reality or other extended reality experiences.

* * * * *